Dec. 1, 1931.    D. H. REED    1,834,071
OUTSIDE PIPE CUTTER
Filed Nov. 22, 1928    2 Sheets-Sheet 1

Dempson H. Reed Inventor

By Jesse R. Stone
Attorney

Dec. 1, 1931. D. H. REED 1,834,071
OUTSIDE PIPE CUTTER
Filed Nov. 22, 1928 2 Sheets-Sheet 2

Dempson H. Reed Inventor

By Jesse R. Stone
Attorney

Patented Dec. 1, 1931

1,834,071

UNITED STATES PATENT OFFICE

DEMPSON HERBERT REED, OF HOUSTON, TEXAS, ASSIGNOR OF ONE-HALF TO JAMES S. ABERCROMBIE, OF HOUSTON, TEXAS

OUTSIDE PIPE CUTTER

Application filed November 22, 1928. Serial No. 321,052.

My invention relates to pipe cutters for cutting pipe in wells and is more specifically a cutter of this character adapted to cut the pipe from the outside.

In devices of this kind where a pipe is broken off in the well, such as a drill stem or other similar pipe, the pipe is withdrawn, if it can be lifted, but if it can not be removed from the well as a continuous string it may be removed in sections by telescoping a cutter down over the outside of the pipe which is lodged in the well and the cutter is employed to cut the pipe through from the outside so as to remove the same in sections.

This application is intended to cover broadly the subject matter of the invention and one specific improvement is disclosed in my co-pending application Serial No. 332,003, filed January 12, 1929.

Devices of this character have been previously devised but in most of them it is difficult, if not impossible, to release the pipe engaged by the cutter where it is found that it can not be removed after the pipe has been severed, or partially severed.

It is an object of this invention to provide an outside pipe cutter, which is capable of engaging over the pipe in the well, and to cut the same and also to remove the section which has been severed, and to provide, in combination with a cutter of this character, a pipe engaging means which is capable of release where the pipe can not be removed after it has been cut, or before the cut is completed.

It is also desired to provide a cutter to engage and sever the pipe in a device as herein set forth and in which the cutters are held positively against engagement with the pipe until the proper point has been reached.

It is also an object to provide a cutter which is adapted to most effectively engage and sever the pipe when the device is rotated.

It is a further object to provide a pilot to be used in advance of the cutter, which is designed to open the passage above the pipe which is lodged in the well, so that it may be engaged by the cutter in the proper manner, and to construct such a pilot in a simple and economical manner.

Other objects of the invention lie in the construction of a simple and compact device, the invention residing in the particular arrangement and construction of the parts thereof.

With reference to the drawings herewith, Fig. 1 is a central longitudinal section through a device for severing pipe, my invention being shown in connection therewith.

Figure 1:
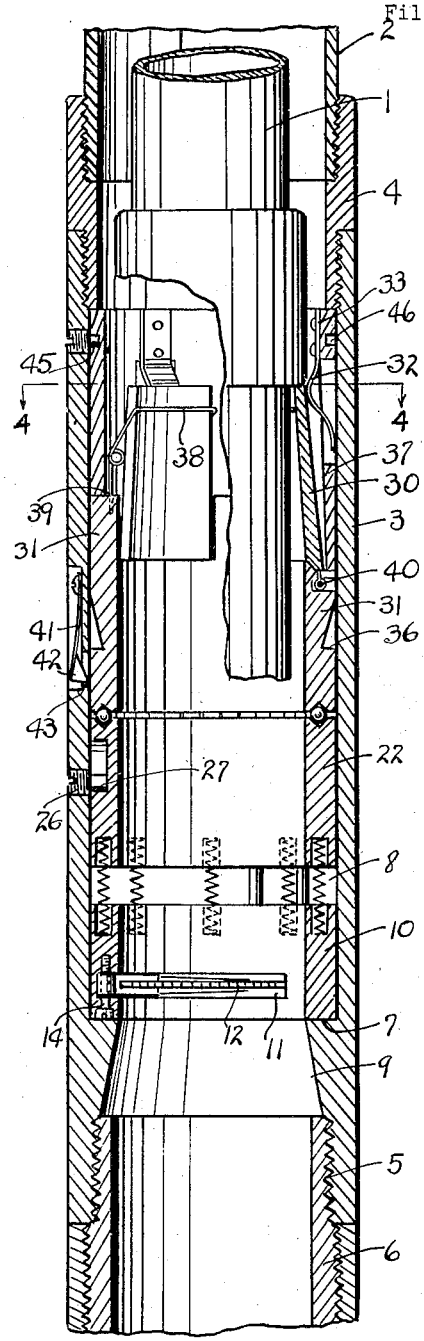

As previously stated, the device is adapted to be set down over the upper end of the pipe which is to be cut. In the drawings a broken pipe section is shown at 1, and it is to be understood that this section may be of any length. The cutter is mounted at the lower end of a drill stem 2, the device being enclosed within a tubular housing 3 connected with the drill stem by means of a coupling or collar 4. The said housing 3 is threaded at its lower end 5 for connection with the head 6 of the pilot, which will be later described. Adjacent the lower end of the housing the inner wall is extended inwardly to provide a shoulder 7 marking the lower boundary of a chamber 8 within the housing 3, in which my cutting mechanism is adapted to operate. Below the shoulder 7 the inner wall of the housing is flared downwardly at 9 to guide the pipe upwardly into the cutting head.

Figure 7:
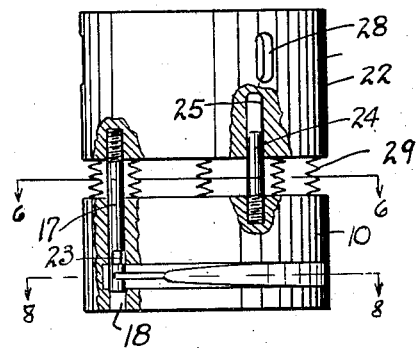
Fig. 7 is a side view of the cutter ring and trip collar connected therewith, parts being broken away for greater clearness.
Figure 8:
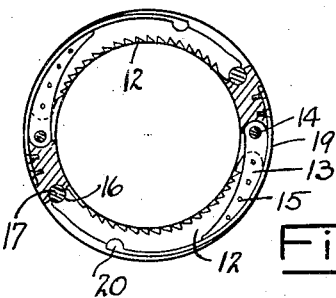
Fig. 8 is a transverse section on the plane 8—8 of Fig. 7. Like numerals of reference are applied to like parts in all the views.

The ring 10, upon which the cutters are mounted, is seated upon the shoulder 7 and fits closely within the inner wall of the housing. This cutter ring has a plurality of cutting blades mounted therein. I have shown two such blades mounted in opposite slots 11 in the ring. These blades 12 are connected at one end to hinge plates 13 pivotally mounted upon bolts or pins 14, set upwardly from the lower end of the ring. The cutter blades are connected with the hinge plates 13 by means of rivets 15, or otherwise. The ends opposite the hinged ends of the blades are formed with notches 16 therein, in which are engaged trip pins 17. Said pins are extended downwardly from the upper side of the ring, as shown best in Fig. 7, and are slidable in the ring within the passage 18 in said ring. Said cutter blades have saw teeth thereon. They are adapted to be thrown inwardly toward the pipe by springs 19 mounted in the said slots 11 in the ring adjacent the pivoted end of the blades. Said springs are curved to bear against the cutter blades at the forward ends of said springs, as shown at 20. When the blades are released from their connection with the trip pin 17 they will be swung on the pivots 14 inwardly against the pipe.

Above the cutter ring with the cutters therein is placed a trip collar 22. It is slidable in the housing and is adapted to co-operate with the cutter ring to assist in releasing the cutter blades when the device is ready to operate. The pins 17 are secured in the lower side of the trip ring and extend downwardly through the openings 18 therein, as previously noted. In the side of said trip pins, adjacent the ends of the saw blades, are notches 23. The notches are extended part way through the diameter of the pin and when the pins have been pushed downwardly from the latching position shown in Fig. 7 the notches 23 will come into registration with the ends of the cutter blades so as to release said blades, allowing the springs to throw the blades free of the trip pins and into engagement with the pipe. There are two of these trip pins, one for each cutter blade. I contemplate holding the cutter ring and the trip collar in vertical registration by means of dowel pins 24, secured in the cutter ring and extending upwardly into recesses 25 extending part way through the trip ring. The two rings are held from rotation relative to the housing by means of pins 26 secured through the wall of the housing and having the forward end 27 thereon fitting within longitudinal slots or recesses 28 in the outer walls of the trip ring. I may have as many of these pins fitting within the slots 28 as may be necessary to communicate a rotating movement from the housing to the trip ring and the cutter ring.

The two rings are held normally in spaced relation by means of tension springs 29 fitting within opposite recesses in the two rings, as will be noted particularly from Fig. 1.

Figure 4:
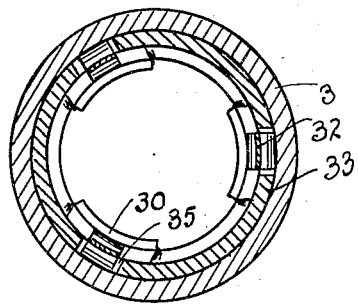
Fig. 4 is a transverse section taken on the plane 4—4 of Fig. 1.
Figure 6:
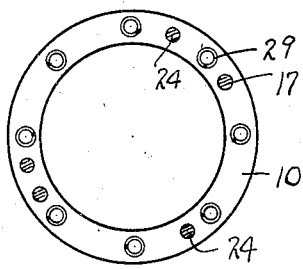
Fig. 6 is a transverse section taken on the plane 6—6 of Fig. 7.
Figure 5:
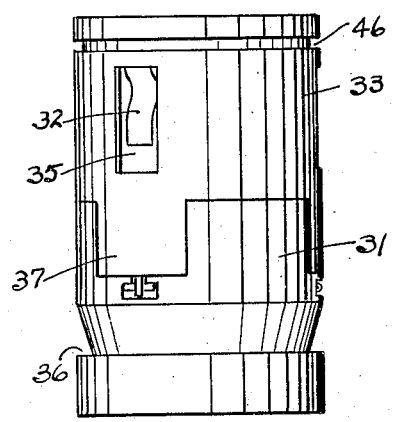
Fig. 5 is a side elevation of the sleeve upon which the anchor dogs are mounted, shown in connection with the spring supporting collar.

The device is adapted to engage with the pipe to be cut through means of dogs 30 mounted upon a dog sleeve 31, mounted for rotation above the trip collar 22. The said sleeve 31 has a plurality of beveled recesses in the upper end thereof to receive the lower ends of the dogs 30. I have shown three such dogs in this embodiment. Each dog is arcuate in shape, as shown in Fig. 4. The upper ends thereof are inclined inwardly toward the pipe 1, which is to be engaged, by means of springs 32, secured upon a co-operating spring supporting collar 33. The side walls of the anchor sleeve 31 are extended above the base of the dogs on each side of said dogs, while the lower end of the spring supporting ring is formed with downwardly extending arms 37 adjacent said dogs. Above the arms 37 the spring supporting sleeve 33 is recessed at 35 to provide space for the spring 32 to extend outwardly against the inner wall of the housing. Below the anchor dogs the sleeve 31 is provided with a groove, the lower side of which is formed with a shoulder 36, the wall of the groove above this shoulder being inclined outwardly and upwardly.

The dogs 30 are held normally inwardly toward the pipe 1 by the springs 32, as previously noted. They are under tension from the inner sides by springs 38, shown best in Fig. 1. These springs are secured at 39 in holes bored within the upper end of the sleeve 31. These springs are of ordinary construction and are weaker than the outer springs 32, but when the said dogs are relieved from the pressure of springs 32 springs 38 tend to force the dogs back outwardly on their lower pivots shown at 40. The housing 3 has in its outer wall a recess 41 in which there is a spring pressed dog 42 secured within said recess and having its lower end adapted to pass through an opening 43 to engage against the outer surface of the sleeve 31. The spring 41 is under tension, tending to force the dog through the opening 43 to engage above the shoulder 36 in the sleeve and when said sleeve has been properly depressed this engagement will take place automatically, preventing the upward movement of the sleeve 31 thereafter. The spring supporting sleeve 33 is held against downward movement by engagement of pins 45 in the housing 3 within a peripheral groove 46 in said sleeve 33.

Figure 2:
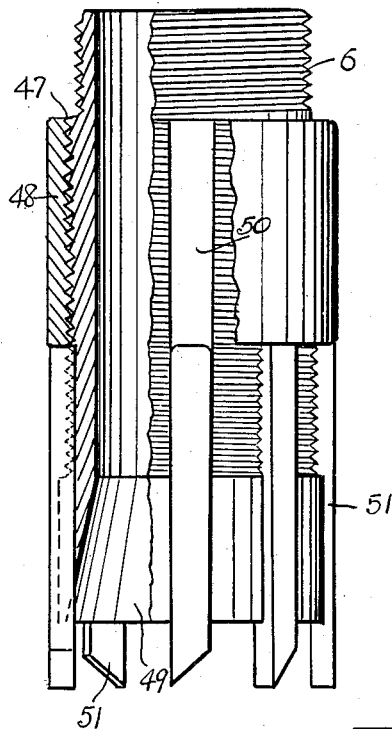
Fig. 2 is a side view, partly in section, illustrating the construction of the pilot to be used with the invention.
Figure 3:
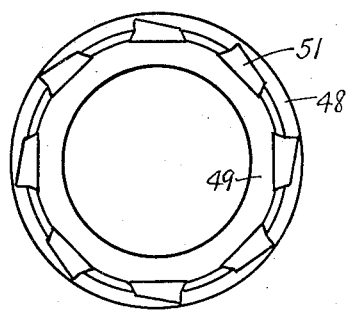
Fig. 3 is a bottom plan view of the device shown in Fig. 2.

The pilot which is employed with my device may be constructed as shown best in Figs. 2 and 3. It has an upper threaded shank 6 for engagement with the housing of the cutter and below said shank the device is threaded at 47 on its outer surface to accommodate a collar 48. The lower end of the head, which is of tubular construction, has a flared opening 49 therein. The outer threaded surface 47 of the head is provided with a plurality of downwardly tapering grooves 50, in which are adapted to fit cutter blades 51. The grooves 50 are not only tapered from the upper ends downwardly but are dove-tailed or morticed to receive the inner sides of the cutter blades 51. This will be understood from Fig. 3. Thus the blades may be inserted downwardly in the grooves 50 from the upper end of the head and will wedge within said grooves and will also be held against movement outwardly by the dove-tailed or morticed connection of the blades in the grooves. When the blades have been thus inserted the collar 48 may be screwed downwardly against the upper end of the blades 51 and will tend to thus hold the blades firmly locked in position. When the cutters have been dulled they may be removed and sharpened and the tapered edge ground somewhat to allow the cutters to move slightly down in the grooves to take up for the wear and the collar will again clamp them in position.

In the operation of my device the parts are assembled, as shown in Figs. 1 and 2, with the pilot or bit head at the lower end of the housing. The device may be thus inserted downwardly into the hole and, if any material has fallen into the hole or lodged about the pipe which is to be cut, the device may be rotated to cut away the material, and the cutters 51 at the lower end of the pilot will remove the same and the material may be washed away by the flushing fluid as is usual in drilling. When the cutter has been telescoped downwardly over the upper end of the pipe 1 a sufficient distance it may be drawn upwardly relative to the said pipe 1 until the dogs 30 engage beneath a collar upon said pipe. The springs 32 will hold said dogs in position to thus engage the pipe. Further upward movement of the device will cause the dog supporting sleeve 31 to be depressed while the spring supporting sleeve 33 will remain stationary. The depression of the sleeve 31 will eventually move it into position where the latching dog 42 will engage above the shoulder 36 and hold it in the depressed position. As the sleeve 31 moves downwardly it will carry with it the trip ring 32 against the pressure of the springs 29 and will force the trip pins 17 into position to release the cutter blades 12 so that they may be thrown inwardly against the pipe 1.

The device may then be rotated in a right-hand direction and the teeth upon the cutters will engage the pipe under the pressure of the springs 19 and will rapidly cut through the pipe, severing the upper section, which may then be removed. During this rotation the lower cutter ring and trip ring will rotate with respect to the pipe while the dog supporting sleeve 31 will be held stationary, the dogs engaging the stationary pipe 1, which is being severed. In their lower depressed position the dogs 30 are below the springs 32 and relieved from pressure of said springs. The inner springs 28 will tend to throw the dogs outwardly when the frictional engagement between said dogs 30 and the collar on the pipe 1 has been relieved. The upward tension on the pipe 2 will be continued, however, during the rotation of the pipe so that the dogs will be held in the position engaging the pipe and when the pipe has been fully severed so that the upper section may be raised, the tension on the pipe will tend to draw the severed portion upwardly so that it may be removed from the well. If, however, it cannot be removed for some reason, due to the fact that it has not been properly severed or the blades have been broken so that the cut can not be completed, the drill stem may be dropped slightly so as to release the frictional engagement with the pipe 1 and the collar thereon, and the springs 38 will then act to throw the dogs outwardly away from the pipe 1 and allow the device to be removed from the well, leaving the pipe 1 in the hole.

The advantages of this construction lie in the positive manner in which it may operate without danger of failure in the well and in the fact that it may be released and withdrawn, if desired, without removing the severed section of pipe. The particular pilot which I employ is of cheap and economical construction and also effective in cutting away material so that the cutter itself may be employed in severing the pipe. Further advantages of the construction will be obvious to those skilled in the art.

What I claim as new and desire to protect by Letters Patent is:

1. In an outside pipe cutter, a tubular housing, a cutter ring supported therein, cutters thereon, a trip-collar above said ring, a pipe-engaging stop means above said collar, dogs on said stop means, spring means tending to force said dogs inwardly, means to retract said dogs when said dogs are moved downwardly relative to said spring means, and means to move said cutters inwardly operable through the downward movement of said dogs and collar relative to said cutters.

2. In an outside pipe cutter, a tubular housing, a cutter ring supported therein, cutters thereon, a trip-collar above said ring, a pipe-engaging stop means above said collar, dogs on said stop means, spring means tending to force said dogs inwardly, and means to retract said dogs when said dogs are moved downwardly relative to said spring means.

3. In an outside pipe cutter, a tubular housing, a cutter ring supported therein, cutters thereon, a trip-collar above said ring, a latch pin on said collar holding said cutters normally retracted, a pipe-engaging stop means above said collar, dogs on said stop means, spring means tending to force said dogs inwardly, means to retract said dogs when said dogs are moved downwardly relative to said spring means, and means to move said cutters inwardly operable through the downward movement of said dogs and collar relative to said cutters.

4. In an outside pipe cutter, a tubular housing, a cutter ring supported therein, cutters thereon, a trip-collar above said ring, a pipe-engaging stop means above said collar, dogs on said stop means, spring means tending to force said dogs inwardly, means to retract said dogs when said dogs are moved downwardly relative to said spring means, means tending to move said cutters inwardly, and means to restrain such movement released by the relative downward movement of said trip collar.

5. In an outside pipe cutter, a tubular housing, a cutter ring held against downward movement therein, spring pressed horizontally pivotal cutters therein, means to normally restrain said cutters from inward movement, pipe-engaging means longitudinally movable in said housing, and means actuated by downward movement of said pipe-engaging means to release said cutters.

6. In an outside pipe cutter, a tubular housing, a cutter ring held against downward movement therein, horizontal pivotal cutters therein, means to normally restrain said cutters from inward movement, pipe-engaging means longitudinally movable in said housing, and means actuated by downward movement of said pipe engaging means to release said cutters, and means to move said cutters resiliently inwardly.

7. In an outside pipe cutter, a tubular housing, a cutter ring held against downward movement therein, horizontally movable cutters therein, means to normally restrain said cutters from inward movement, pipe-engaging means longitudinally movable in said housing, means actuated by movement of said pipe engaging means to release said cutters, means to move said cutters inwardly on a vertical axis, and means to rotate said housing and cutters.

8. In an outside pipe cutter, a tubular housing, a cutter mounted therein, said cutter comprising an arcuate blade, saw teeth on said blade, a spring to force said blade inwardly for cutting upon rotation of the cutter and means to hold said blade from inward movement releasable through longitudinal movement of said housing.

9. In an outside pipe cutter, a tubular housing, a pipe engaging stop means, movable in said housing, dogs on said stop means, spring means normally retaining said dogs in pipe engaging position and additional spring means to retract said dogs after they have been moved longitudinally by engagement with the pipe.

10. In combination with an outside pipe cutter, a set of pipe engaging dogs, springs normally urging said dogs inwardly, said dogs being so mounted that they may move longitudinally when engaged beneath a collar on the pipe to be cut, and additional springs operative after such movement to retract said dogs.

11. In combination with an overshot tool a set of pipe engaging dogs, springs mounted on said tool and normally urging said dogs inwardly, said dogs being so mounted that they may move longitudinally away from said springs when engaged beneath a collar on the pipe, and additional means to retract said dogs after release from the pipe collar.

In testimony whereof I hereunto affix my signature this 8th day of November A. D. 1928.

DEMPSON HERBERT REED.